July 14, 1931.  A. L. KLEES ET AL  1,814,812
FLUID FLOW REGULATING MECHANISM
Filed Jan. 29, 1930   2 Sheets-Sheet 1
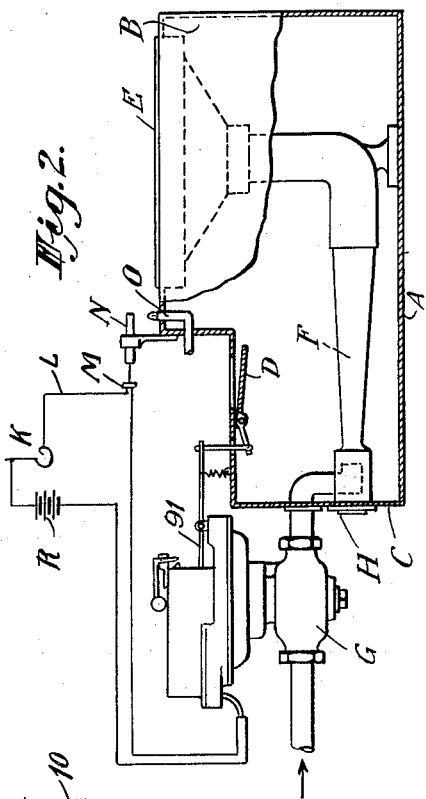
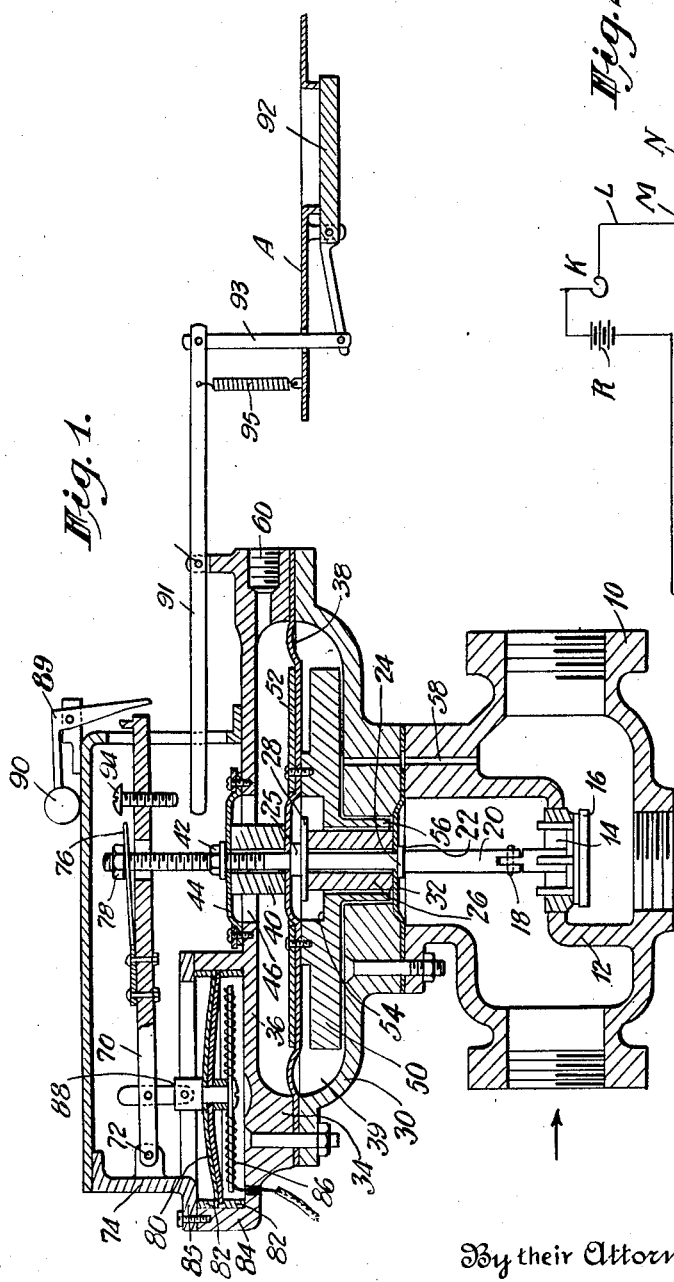
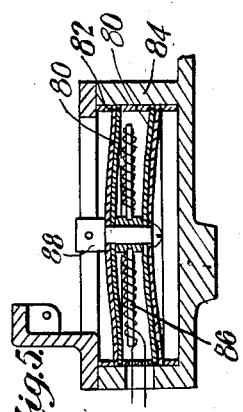
Inventor
ALBERT L. KLEES
BENJAMIN GREENFIELD
By their Attorney
Edmund G. Borden

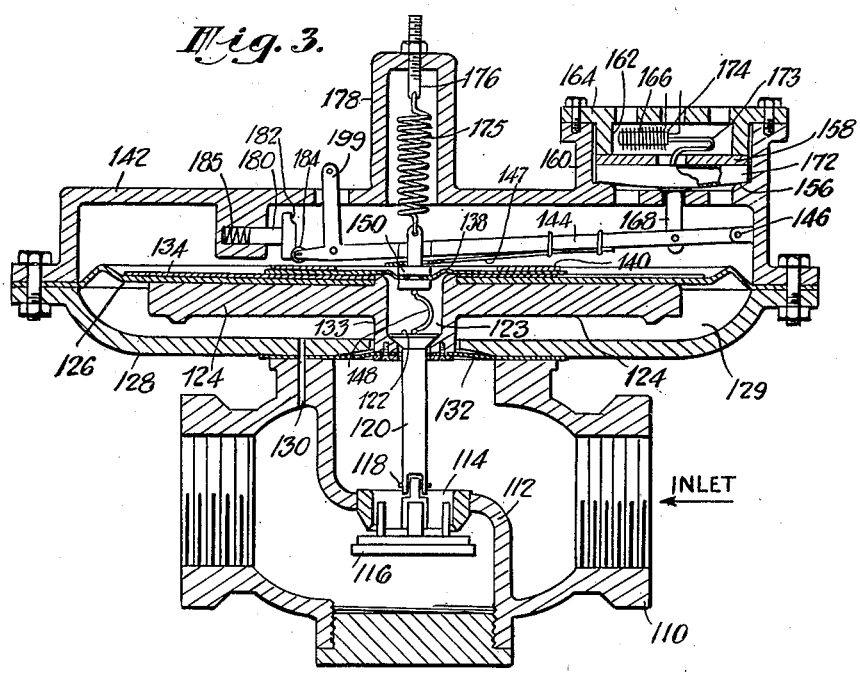
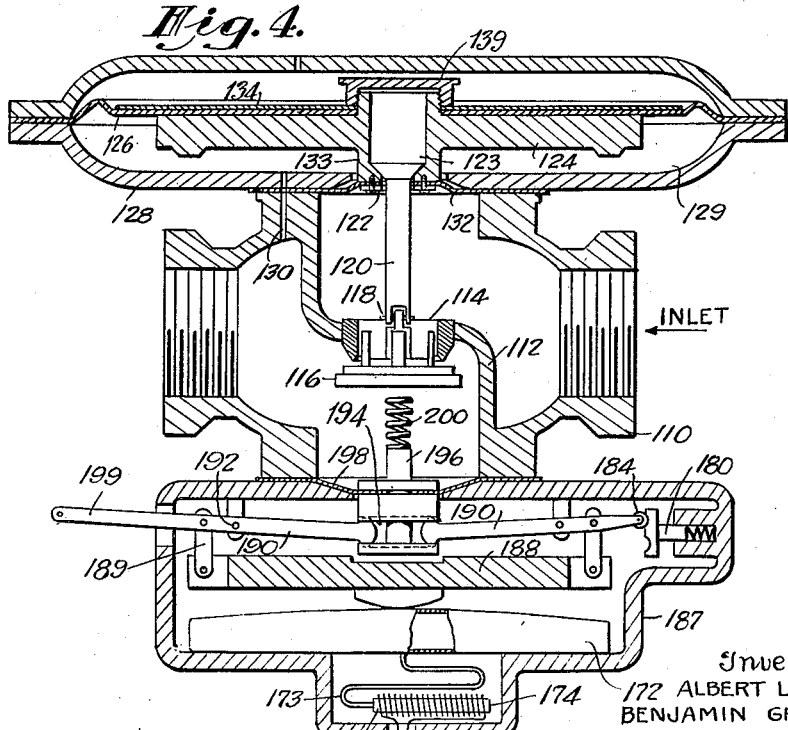

Patented July 14, 1931

1,814,812

UNITED STATES PATENT OFFICE

ALBERT L. KLEES, OF LONG BEACH, AND BENJAMIN GREENFIELD, OF JACKSON HEIGHTS, NEW YORK, ASSIGNORS TO SURFACE COMBUSTION CORPORATION, OF TOLEDO, OHIO, A CORPORATION OF NEW YORK

FLUID FLOW REGULATING MECHANISM

Application filed January 29, 1930. Serial No. 424,153.

This invention relates to improvements in fluid flow regulating mechanism and also in combined gas pressure regulators and cut-offs, and has for its general object to provide a device of the character indicated which shall have special utility in connection with gas burning appliances adapted for use with domestic house heating furnaces.

Gas burning appliances of the type indicated are customarily controlled, as regards shutting off the flow of gas to the burner, by means of a room thermostat in circuit with a motor mechanism adapted to actuate a gas valve having no connection with the pressure regulator. In some instances, this motor mechanism has also been provided with means for actuating the secondary air damper of said appliance. The commonly used motor mechanism for the aforesaid purpose is a relatively expensive piece of equipment and moreover, is not adapted for regulating the pressure of the gas coming from the gas mains. It is, therefore, necessary to provide a gas pressure regulator as a separate piece of equipment which of course is an added item of expense.

Fluid flow regulating and cut-off mechanism have been employed in gas heating installations for automatically opening the gas line to a burner when there is a demand for heat at some selected point remote from the burner, and for cutting off the flow of gas through such line when the demand for heat ceases. Such mechanism of the prior art, however, when functioning tends to operate at a relatively slow rate. The slow opening and closing of the valve often causes back-fires and gas leakage, and is generally unsatisfactory.

It is an object of the present invention to provide a fluid flow regulating mechanism which is quick and sure in its operation and which eliminates back-firing and leakage past the said mechanism.

It is a further object of the present invention to combine with a pressure regulator a simple and practical mechanism for actuating the pressure regulator valve in a manner to cut off the flow of gas through the regulator when conditions are such that gas is not required, as for example when a certain heat condition resulting from burning of the gas passed by the regulator has been attained. More particularly, it is an object of the invention to provide a low cost motor mechanism for actuating the valve as aforesaid. Other objects and advantages of the invention will more fully appear hereinafter.

Referring to the drawings wherein various forms of the invention are shown:—

Fig. 1 is an axial cross section of a combined pressure regulator and cut off mechanism embodying the preferred form of the invention;

Fig. 2 is a more or less diagrammatic illustration of a gas burning appliance adapted for use with house heating furnaces and showing how the invention may be combined therewith;

Fig. 3 is a view corresponding to Fig. 1 and showing a modified form of means for actuating the valve independently of the pressure regulating diaphragm;

Fig. 4 is a still further modified form of the invention, and Fig. 5 illustrates the use of a pair of heat responsive disks for the heat motor instead of a single disk as in Fig. 1.

Like reference characters refer to like parts throughout the several views.

Before describing the invention itself, the environment where the invention finds special utility will first be described. The gas burning appliance shown in Fig. 2 comprises an elongated casing A having an angular open-top extension B, a front closure C and a damper D. Mounted within the angular extension B is a gas burner E to which a mixture of gas and air is supplied by a mixing tube F which receives in an appropriate manner, gas passed by the gas valve within the device G which forms the subject of the present invention. The mixing tube F receives primary air through an opening in the closure C, said opening being controlled by a shutter generally indicated at H. Secondary air for the burner enters the casing A through an opening controlled by the damper D. This damper is preferably connected, by suitable instrumentalities generally indicated by numeral 91, to the device G whereby when the gas valve within said device is open to admit gas to the burner, the damper will also be opened to admit secondary air and vice versa.

It will, of course, be understood that that portion of the casing A having the angular extension B will be positioned within the furnace to be fired, the other portion of the casing projecting outside of the furnace through the ashpit-door-opening therein. The manner of combining the gas burning appliance with a furnace forms no part of the present invention and has therefore not been illustrated.

K indicates a room thermostat in a circuit L which is adapted to be interrupted by a switch M controlled by a thermal element N adapted to be heated by a burner pilot O in such a manner that when the pilot is burning, but not otherwise, the switch M will be maintained in closed position—the circuit L when closed, as when there is a call for heat, being adapted to actuate certain mechanism within the device G for actuating the gas valve as will be presently explained.

The pressure regulator side of the invention will now be described. Referring to Fig. 1, 10 indicates a valve body or casing provided with a partition 12 wherein is formed a port opening 14 adapted to be closed by a valve 16 flexibly connected as at 18 to a valve stem 20 having formed thereon a shoulder 22, the upper end of the stem 20 being threaded for a purpose to be disclosed. A hollow bowl-shaped member 30 is mounted on the valve body 10, and a flexible sealing diaphragm 32 is secured between them by bolts or the like as shown. The diaphragm 32 is also secured to the stem 20 between a washer 24 held adjacent the shoulder 22 and a collar 26 surrounding stem 20. A housing 34 having an inverted bowl-shaped portion 36 is secured to the member 30, and a flexible pressure-regulating diaphragm 38 is secured at its outer margins therebetween. Diaphragm 38 is also secured to the stem 20 between a washer 25 and a collar 40, both of which are freely mounted on the stem 20. A washer 28 mounted on the valve stem is interposed between the collar 26 and the washer 25. A flexible diaphragm 44 is secured to the housing 34 adjacent a central opening 46, and is also secured to the stem 20 between one end of the collar 40 and an adjusting nut 42. The tightening of the respective diaphragms 32, 38 and 44 upon the stem is accomplished simultaneously by means of the adjusting nut 42, the cooperating collars 26 and 40, and the washers 24, 25 and 28.

A floating weight 50 is positioned within the chamber 39 between the member 30 and the diaphragm 38, and is secured thereto by bolts or the like passing through the same and through an upper retaining ring 52. The weight 50 has a shoulder 54 adapted to engage with the washer 28 when the weight is raised under the action of the diaphragm 38. A depending guide boss 56 of the weight floats freely in the space between the collar 26 and member 30.

A passageway 58 connects the outlet end of the valve casing 10 with the chamber 39. An outlet 60 is provided in housing 34 for conducting gas away from the space immediately above diaphragm 38 in case of accidental gas leakage past the said diaphragm.

For supporting a heat motor mechanism a supporting member or housing 74 is mounted upon the housing 34 and has pivoted at one end 72 thereof, a lever 70. The said lever carries a flat spring 76 having an aperture near one end through which the upper portion of the valve stem 20 freely extends, the latter likewise passing through an enlarged aperture in the lever 70. An adjusting nut 78 permits adjustment of the valve stem with respect to the lever 70 and spring 76. The arrangement of the apparatus is such that when the lever 70 is in lowered position, the valve is open due to the weight of the valve and the parts secured thereto, while the functioning of the device as a pressure regulator is not interfered with. It will also be evident that the valve 16 can be closed by upward movement of said lever 70. When the valve is closed in this manner, gas pressure will no longer be effective in the chamber below diaphragm 38 and hence the weight 50 will drop and remain in contact with the bottom of the chamber 39 until such time as the valve 16 is released by said lever whereupon the apparatus will again function as a pressure regulator.

In accordance with this invention, the valve 16 is subject to control by a heat motor which in turn is subject to control by the room thermostat. The control exercised by the thermostat is such that when there is call for heat where the thermostat is located, the heat motor will be put in such condition that the mechanism controlled by the motor will be incapable of closing the valve 16. For purposes of description, it will be assumed that where there is call for heat as aforesaid, the thermostat circuit L will close whereupon heat will be supplied to the heat motor as by a battery R in said circuit.

Referring to the preferred type of heat motor shown in Fig. 1 this motor comprises one or a cooperating plurality of flexible bimetallic diaphragms or disks 80 adapted when in one thermal condition to assume a convexo-concave form and when in another thermal condition to assume a concavo-convex form, the change in condition of curvature being accompanied with a sudden snap action on either side of a dead center condition of the disk. Disks having this type of action are commonly known as "clicker" disks. The rim of each disk 80 is confined between a pair of rings 82 within a shallow cup-shaped portion 84 of the housing 34, the rings being held against upward displacement by an annular flange 85 on the lower margin of the member 74 and bolted to housing 34. Each disk is adapted to be heated by a heating element 86, and is connected to the lever 70 by a link 88. When the parts are in the condition shown in Fig. 1, there is no call for heat at the thermostat K, which, of course, means that the heating element 86 is not functioning and that the disk is maintained in a cold condition. In this condition of the heat motor or disk 80, the lever 70 is in its uppermost position, and the valve 16 is closed under the effect of the force developed in the bimetallic disk or disks. On the other hand, when there is a call for heat at the thermostat K, the disk will be heated and will assume a concavo-convex form, or in other words, will be reversely curved with respect to the curvature of the disk shown in Fig. 1, and hence the lever 70 will be at the lower limit of its movement with the result that the valve 16 will be opened under the effect of the total weight of the valve, valve stem, and associated parts, which should be equal to or greater than the available upward pressure of the gas on the delivery side of the valve 16. The flat spring 76 functions to hold the valve tight to seat until the snap disk is ready to snap. This is necessary since the snap diaphragm moves slowly about 25% of its total travel before reaching the snap point. In the closed position of the valve, the pressure of valve disk 16 on its seat is determined by the tension of the spring 76. It will, of course, be appreciated that on the opening movement of the valve it will be restored to the control of the regulating diaphragm 38 with a snap action and with a resultant wide opening of the valve. The provision of a heat motor and yieldingly-operated lost-motion take up mechanism for closing the valve with a snap action is an important feature of the invention since slow closing of the valve 16 is liable to cause the burner E to backfire. It is equally important that the valve 16 be fully opened suddenly in order to prevent backfire of the burner due to insufficient gas being delivered to the burner.

A V-shaped latch 89 is pivotally secured to the upper part of housing 74 and is provided at one end with a counterweight 90. The other end of the latch is adapted to engage the free end of the lever 70 when the latter is depressed. This permits manual operation of the valve in case of failure of the electrical current in circuit L.

For automatically controlling the operation of the secondary air damper in accordance with the demand for heat, a lever 91, pivotally secured to a part of the housing 34, has one end operatively associated by means of link 93 with a damper 92 pivotally secured to the casing A for movement within the same. The other end of lever 91 is adapted to contact with an adjustable screw 94 on lever 70 for movement downwardly with the latter. A spring 95 connects the casing A with the lever 91 adjacent the link 93 and yieldingly opposes any movement of the lever due to the action of the lever 70 and screw 94.

Turning now to Fig. 3 which shows a modified form of heat motor and snap action control mechanism, 110 indicates a valve body or casing provided with a partition 112 having formed therein a port opening 114 adapted to be closed by valve 116, flexibly connected to a valve stem 120 having at its upper end a head 122 which is received within a cavity 123 formed in a weight 124, to the upper side of which is suitably secured a flexible regulating diaphragm 126, the latter of which extends across and forms a top seal for a bowl 128 mounted on the valve body 110. The chamber 129 formed by the said diaphragm and bowl are connected by a passage 130 with the delivery side of the valve body whereby any gas pressure which is effective at the delivery side of the said valve body will also be effective in the said chamber. Gas pressure on the inlet side of the valve body is prevented from being effective in the chamber 129 by a flexible sealing diaphragm 132 suitably secured to the depending guide boss 133 of the said weight and clamped between the rim of the bowl 128 and the valve body 110 as will be readily understood. For properly securing the diaphragm 126 to weight 124 a ring plate 134 is provided between which and the weight, the diaphragm is clamped. The provision of a suitable cap or seal at the top of the cavity 123 will obviously permit the diaphragm 126 to regulate the delivery pressure from the casing 110. In Figs. 1 and 3 this seal is a flexible diaphragm, whereas in Fig. 4 it is a non-flexible cap 139. The said sealing diaphragm 138 is conveniently clamped between the plate 134 and a ring plate 140,—or a large diaphragm 126 may be designed to function also as such sealing diaphragm.

142 is a housing between the rim of which and the rim of the bowl 128 the rim of the pressure regulating diaphragm is clamped. Within this housing is a lever 144 which at one end is pivoted to the housing as at 146, and which intermediate its ends is flexibly connected and operatively associated with the valve stem 120 by means of a flat spring 147 secured to the lever 144 and cooperating with a fixture. 150 secured to the diaphragm 138 and secured to the said valve stem through the intermediary of a flexible chain or cable 148. When the cable 148 is slack so as to allow the valve stem head 122 to be supported on the bottom margin of the cavity 123, it is evident that the functioning of the device as a pressure regulator is not interfered with by the lever 144.

The form of heat motor and snap action control mechanism shown in Fig. 3 comprises a metal container 172 adapted to contain an expansible fluid. This container is confined between the annular shoulder 156 and a ring plate 158 within said housing 160, the plate being held against upward displacement by the annular flange 162 on a cover plate 164. The container 172 is shown as connected by a short metal tubing 173 with a bulb or reservoir 174 of the said fluid, around which reservoir is wound a suitable heating element 166. The reservoir 174 may be at some distance from the container 172, or even outside the housing 160. When the thermostat circuit L is closed, the heating element 166 will heat the fluid within the reservoir 174, preferably without appreciably heating the fluid in container 172, whereupon the bottom of the container will move downward with a snap motion due to the expansion of said fluid as will be readily understood. Pivoted to the lever 144 and abutting the bottom of the container 172 is a link 168. When the parts are in the condition shown there is supposed to be a call for heat at the thermostat K which, of course, means that the fluid within the container 172 and reservoir 174 is in expanded condition due to heat applied by the heating element 166. It will, therefore, be readily appreciated that the valve 116 is freely subject to control by the regulating diaphragm 126.

With the heat motor of the type shown in Fig. 3, it is necessary to provide special means for closing the valve 116 when there is no call for heat at the thermostat. For this purpose, there is provided a tension spring 175 connected at one end to the fixture 150 and secured at its other end to an adjustable abutment 176 which may conveniently be mounted at the top of a housing 178. The tendency of the spring 175 to close the valve 116, is, of course, normally opposed by the heat motor 172 when the fluid therein is in an expanded condition. If desired the tension spring 175 may be replaced by a helical compression spring operatively interposed between the lever 144 and the ring plate 140. To obtain the desired snap action of the valve, there is provided a spring-pressed plunger 180 having an upright head, the face of which is provided with two spaced notches 182, one at either end of the head. The lever 144 is provided with an extension at the terminal of which is mounted a roller 184 adapted when the lever 144 is at the upward and downward limits of its movement to rest in the upper and lower notches 182 respectively in the plunger head. The arrangement is such that the plunger impositively locks the lever at said limits of its movement until such time as sufficient power is accumulated on the lever by the spring or the heat motor as the case may be, to cause the roller 184 to ride out of the notch by compressing the spring 185. As soon as the roller rides out of the notch, it will move with a snap action, either to take the slack out of the cable 148 and thereby close the valve or to release the valve to the control of the regulating diaphragm 126 as will now be readily understood. To explain this action somewhat further, it will be understood that the element of time is involved in heating and cooling the expansible fluid within the heat motor 172, and in the absence of a snap action diaphragm or its equivalent and restraining means such as here employed, the lever would move in conformity with the expansion and contraction of the motor fluid, which movement would be relatively slow.

Referring now to Fig. 4, wherein another modified form of the invention is shown, the cut-off mechanism for the valve is located below the valve in place of above as in Figs. 1 and 3. In accordance with this form of the invention, there is secured to the bottom side of the valve 110 a housing 187 wherein is positioned a heat motor embodying a flexible bottom metallic fluid container 172, a fluid reservoir 174 and a short connecting tubing 173 similar to those shown in Fig. 3, the upper side of the container being adapted to move upwardly with snap or instantaneous movement when the fluid in the reservoir is heated. In the position of the valve according to Fig. 4, the fluid in the heated reservoir or extension 174 is in a heated condition. Resting on the upper surface of the container 172 is a weight 188 which at opposite ends is provided with upright links 189 pivoted to levers 190 which are pivoted intermediate their ends as at 192 to lugs depending from the top of the housing 187. The adjacent ends of the levers 190 have ball terminals which are received in an annular recess 194 formed in the body of a plunger 196 which is in axial alignment with the valve stem 120 of the valve 116. For preventing leakage of fluid from the valve casing into the housing 187, there is provided a suitable seal or diaphragm 198 which is clamped between the valve casing 110 and the top of the housing 187, and which is, of course, suitably secured to the plunger 196 to make a tight joint therewith. It will now be readily understood that when the fluid within the reservoir 174 is heated, the upper wall of the container moves upwardly and lifts the weight 188 which in turn through the linkage already described moves the plunger 196 downwardly away from the valve 116. When the fluid in the reservoir 174 is cold, the weight moves downwardly with the top of the container and thereby moves the plunger 196 upwardly as a result of which the plunger will engage the valve and cause it to close.

Since as before stated it is desirable that the valve 116 should be opened and closed with a snap action, there is provided for this purpose a spring-pressed plunger 180 of the same type as shown in Fig. 3, one of the levers 190 being extended and provided with a roller 184 for engagement with notches in the plunger head as described in connection with Fig. 3. This spring-pressed plunger or hold-back latch 180 preferably should be at a point where movement of the roller 184 may be at about the same magnitude as lever ends 190.

A compression spring 200 is mounted upon the plunger 196 axially thereof for the purpose of taking up the first portion of the movement of the plunger when the valve seat 116 and the plunger are in contact and the valve is in either open or closed position. The spring 200 takes up the first portion of the movement of the plunger under the action of the heat motor until sufficient force has been accumulated to cause the roller 184 to ride out of the notch in the head of the spring-pressed plunger 180. This insures the instantaneous movement of the valve in either direction with a snap action even though actuated by a heat motor capable normally of producing slow movement of the valve through a substantial portion of its travel.

The modification of the invention shown in Fig. 1 is especially designed for ease of assembly and to make readily accessible the various parts of the device for operating adjustments. The latter may be made by removing the top plate of the housing 74. The snap action diaphragms may then be readily removed and replaced. Tightening of the three flexible diaphragms to make them gas-tight is accomplished by the simple tightening of one nut, 42.

The force developed by the bimetallic snap action disks will vary in accordance with the materials employed in their manufacture and in accordance with the size and design of the disks. In some instances it may be desirable to employ, for the development of a suitable force, a plurality of relatively small disks, in place of one large disk of more expensive material and construction.

Fig. 5 shows an arrangement whereby a plurality of such disks are connected together for movement as a unit for the purpose of actuating the lever 70. Additional spacing rings 82 are employed within the well-shaped member 84; and the heating coil 86 is placed mid-way between the two diaphragms but out of contact with either, and insulated therefrom.

In the form shown in Fig. 1 the valve stem and valve disk can move with a minimum of friction; and the upward thrust of the snap diaphragm while cold is used only to hold the valve to its seat, since no duty whatever is required of the snap disk for holding the secondary damper closed. On the other hand when the snap disk is hot, it holds the secondary air damper open against the tension of spring 95, and in accomplishing this the force developed by the disk is assisted by the dead weight of lever 70 and the valve stem assembly. In this manner the power of the disk developed on cooling it is used to close the valve,—and the equal and opposite power developed upon heating of the disk is employed to open the secondary air vent. The two duties are thus not made accumulative to over-load the snap disk. The valve is preferably balanced against inlet pressure by means of flexible diaphragm 32 which has the same effective area as the valve disk 16. The valve however is not balanced against delivery pressure since the diaphragm 32 is held attached directly to the valve stem, thus distinguishing from the constructions shown in the other modifications, and being much simpler for facilitating the ready assembly of parts. The weight of the valve stem assembly should be equal to or greater than the upward pressure on the underside of the valve disk 16. It is desirable to have as much dead weight in the valve stem assembly as the power available in the snap disk or disks will permit, in order to prevent any tendency of the valve to stick in the closed position due to an accumulation of tar or the like at the valve seat. It will be observed that in the closed position of the valve the pressure exerted by the valve disk 16 against the seat is determined by the tension of the flat spring 76. The latter also functions to hold the valve tight to seat until the snap disk is ready to snap. Such a restraining device is essential where instantaneous snap action of the valve in either direction is required, since most snap action disks move about 25% of their total travel at a slow rate before reaching the snap point. It is necessary then to hold the valve closed by the spring 76 while the lever 70 is slowly moved by the bimetallic disk until the snap position is reached. Then as the lever 70 quickly moves under the action of the snap disk, the tension of flat spring 76 is released and the valve thereupon quickly opens.

The invention is obviously adapted for use in an automatic cut-off valve having no pressure-regulating mechanism associated therewith. Where such an automatic cut-off valve is desired, the pressure-regulating diaphragm and parts associated therewith are eliminated. For example, the valve shown in Fig. 1 may be converted so as to operate only as a cut-off valve by redesigning the housing member 34 for mounting it upon the upper surface of the valve casing 10. The gas-tight diaphragm 32 is interposed between these two members and around the valve stem in the usual way. The channel 58 is eliminated from the valve casing 10, and the diaphragms 38 and 44 are likewise unnecessary. The heat motor and associated valve opening parts and damper operating parts are employed in the usual manner.

The curved metal diaphragm employed, either in the form of a bimetallic disk or as one flexible surface of a container adapted to be acted upon by fluid pressure, possesses the ability upon the application thereto of sufficient energy to reverse its curvature with an instantaneous snap movement. However, until the total energy required for this purpose is made available to the metal diaphragm the latter is only slowly movable without such snap action. The yielding member, such as shown at 76 in Fig. 1, is adapted to yieldingly resist this slow movement of the valve which is transmitted from the moving diaphragm until the required amount of energy is developed by the heat motor energizing means to cause the metal diaphragm to suddenly reverse its curvature for operating the said valve instantaneously with a snap movement.

The screw 94 preferably is so adjusted that the force transmitted thereby to the lever 91 for opening the damper 92 is that developed by the disc 80 during the latter portion of its "snap" movement, and after the actuation of the valve.

The rings 82 are preferably of heat-insulating material such as asbestos,—or steps also may be taken to reduce or prevent the conduction of heat from the bimetallic discs to adjacent metallic surfaces.

While the invention has been described with considerable detail, it will be understood that various changes in form and construction may be made without departing from the spirit of the invention.

What is claimed is:

1. In a combined pressure regulator and cut-off mechanism, the combination of a valve casing, a regulating diaphragm and chamber communicating with the outlet of said casing, a valve within said casing connected to said diaphragm, and means independent of the outlet pressure in said casing operable to actuate said valve with an instantaneous snap action independently of said diaphragm to cut off the flow of fluid through said casing.

2. In a combined pressure regulator and cut-off mechanism, the combination with a diaphragm and its chamber and a valve casing provided with a passage extended from the delivery side of said casing to said diaphragm chamber and a valve in said casing normally movable with said diaphragm to permit the latter to regulate the pressure at the delivery side of the casing, of motor actuated means operatively associated with the valve adapted to permit the valve to be actuated independently of the diaphragm with an instantaneous snap action.

3. In a combined pressure regulator and cut-off mechanism, the combination with a diaphragm and its chamber and a valve casing provided with a passage extended from the delivery side of said casing to said diaphragm chamber and a valve in said casing normally movable with said diaphragm to permit the latter to regulate the pressure at the delivery side of the casing, of means independent of the fluid pressure at the delivery side of the said casing and which if unrestrained would operate to actuate the valve to cut off the flow of fluid through said casing, and means controlled by a thermal condition for restraining said last-named means from so operating.

4. In a combined pressure regulator and cut-off mechanism, the combination with a diaphragm and its chamber and a valve casing provided with a passage extended from the delivery side of said casing to said diaphragm chamber and a valve in said casing normally movable with said diaphragm to permit the latter to regulate the pressure at the delivery side of the casing, of a heat motor and a yielding hold back mechanism operatively associated with the said valve, the said motor being controlled by a thermal condition remote therefrom for actuating said valve with an instantaneous snap movement to cut off the flow of fluid through the casing.

5. In a compact unitary structure, a combined pressure regulator and cut-off mechanism, comprising a diaphragm and its chamber, a valve casing provided with a passage extended from the delivery side of said casing to said diaphragm chamber, a valve in said casing normally movable with said diaphragm to permit the latter to regulate the pressure at the delivery side of the casing, a motor operatively associated with the said valve by members including a lost motion connection and controlled by a thermal condition remote from said motor for actuating said valve with an instantaneous snap motion.

6. In a combined pressure regulator and cut-off mechanism, the combination with a diaphragm and its chamber and a valve casing provided with a passage extended from the delivery side of said casing to said diaphragm chamber and a valve in said casing normally movable with said diaphragm to permit the latter to regulate the pressure at the delivery side of the casing, of a heat motor operatively associated with the said valve by members including a lost motion connection and controlled by a thermal condition remote from said motor for actuating said valve with an instantaneous snap movement to cut off the flow of fluid through the casing.

7. In a combined pressure regulator and cut-off mechanism, the combination with a diaphragm and its chamber and a valve casing provided with a passage extended from the delivery side of said casing to said diaphragm chamber and a valve in said casing normally movable with said diaphragm to permit the latter to regulate the pressure at the delivery side of the casing, of a heat motor controlled by a thermal condition remote from the motor for actuating said valve to cut off the flow of fluid through said casing, said motor comprising a resilient metallic body which when cold assumes a given curvature and which when hot assumes a reversed curvature, with an instantaneous snap movement.

8. In a combined pressure regulator and cut-off mechanism, the combination with a diaphragm and its chamber and a valve casing provided with a passage extended from the delivery side of said casing to said diaphragm chamber and a valve in said casing normally movable with said diaphragm to permit the latter to regulate the pressure at the delivery side of the casing, of a heat motor controlled by a thermal condition remote from the motor for actuating said valve to cut off the flow of fluid through said casing, said motor comprising a bimetallic disk which when cold assumes a given curvature and which when sufficiently heated will reverse its curvature with an instantaneous snap action.

9. The combination with a pressure regulator embodying a regulating diaphragm and a valve adapted for movement therewith, of means independent of said diaphragm adapted to be actuated to close said valve, said means including a clicker disk adapted when cold to maintain said valve closed and when hot to permit full control of the valve by said diaphragm.

10. The combination with a pressure regulator embodying a regulating diaphragm and a valve adapted for movement therewith, of a thermal element adapted when in one thermal condition to close said valve with an instantaneous snap action and when in another thermal condition to release said valve with an instantaneous snap action for control by said diaphragm.

11. The combination with a pressure regulator embodying a regulating diaphragm and a valve adapted for movement therewith, of a thermal element adapted when in one thermal condition to close said valve with a snap action and when in another thermal condition to leave the valve free to move with said diaphragm.

12. In a heating system, the combination with a fluid fuel burner for generating heat, a pressure regulator for controlling the pressure of the fuel deliverable to said burner, said regulator embodying a regulating diaphragm and a valve normally subject to control by the diaphragm, and a thermostat responsive to heat generated by said burner, of a heat motor subject to control by said thermostat, and means actuable by said motor for operating said valve with an instantaneous snap movement.

13. In a controlling system for burners, the combination with a valve in a supply line from which fuel is supplied to the burner, of an automatic valve operating mechanism operably associated with the said valve, this mechanism comprising a curved metallic member having respective concave and convex surfaces and adapted when cold to maintain said valve closed and when hot to reverse its curvature with a snap action and release the valve for independent movement.

14. In a controlling system for burners, the combination with a valve in a supply line from which fuel is supplied to the burner of an automatic valve operating mechanism operably associated with the said valve, this mechanism comprising a curved flexible metallic member having respective concave and convex surfaces and adapted when suitably energized to reverse the curvature of the said surfaces with an instantaneous snap action, means associated with the said mechanism and with a thermostat for thus actuating the former, and a yielding member operably interposed between the valve and the said member for yieldingly resisting the transmission of movement between the said diaphragm and the valve.

15. A controlling system for burners comprising the combination with a valve in a supply line from which fuel is supplied to a burner, and a flexible diaphragm continuously subject to the fluid pressure at the delivery side of said valve for closing the latter when the fuel pressure at the delivery side of the valve exceeds a given value, of a heat motor operably associated with the valve through means including a yielding member, the said heat motor comprising a curved flexible metallic diaphragm adapted upon the application of sufficient energy to reverse its curvature with an instantaneous snap movement but being only slowly movable until such energy is available, energizing means for the said metallic diaphragm, the said yielding member being adapted to resist the movement of the valve by storing up as potential energy the energy developed by the heat motor until sufficient thereof is available for causing the metallic diaphragm to suddenly reverse its curvature thereby operating the valve instantaneously with a snap movement.

16. A controlling system for burners comprising the combination with a valve body in a supply line from which fuel is supplied to a burner, of a valve having a valve stem, the latter being mounted for limited axial movement, a heat motor comprising a curved metallic diaphragm adapted, when suitably energized to reverse its curvature with an instantaneous snap action, while being slowly movable without such snap action until a determinant amount of energy is available, a diaphragm energizing means, means for operably connecting the metallic diaphragm with the valve stem for operating the valve in one direction, the said last-named means including a resilient member adapted to limit the axial movement of the valve stem in one direction and to convert to potential energy as rapidly as formed the energy produced by said energizing means until the total energy is sufficient to produce the snap action of the metallic diaphragm.

17. In a controlling system for burners the combination in a unitary structure with a valve in a supply line from which fuel is supplied to a burner, and a flexible diaphragm continuously subject to the fuel pressure on the delivery side of the said valve for closing the latter when the fuel pressure on the delivery side thereof exceeds a given value, of valve operating mechanism including a heat motor adapted for actuating the valve to move it in one direction with a snap action, a yielding member operably interposed between the heat motor and the valve adapted to offer a limited resistance to the said valve movement, an air damper operably associated with the heat motor and adapted to be opened when the said motor operates to produce opening movement of the valve, and a yielding member connected to the damper for resisting the said movement of the damper.

In testimony whereof I affix my signature.
ALBERT L. KLEES.
In testimony whereof I affix my signature.
BENJAMIN GREENFIELD.